United States Patent [19]
Larson et al.

[11] Patent Number: 5,424,898
[45] Date of Patent: Jun. 13, 1995

[54] FAULT TOLERANT DRIVE CIRCUIT FOR ELECTROCHROMIC MIRROR SYSTEM

[75] Inventors: Mark L. Larson, Grand Haven; Desmond J. O'Farrell, Holland, both of Mich.

[73] Assignee: Donnelly Corporation, Holland, Mich.

[21] Appl. No.: 287,472

[22] Filed: Aug. 8, 1994

Related U.S. Application Data

[63] Continuation of Ser. No. 746,361, Aug. 16, 1991, abandoned.

[51] Int. Cl.6 .............................................. H02H 9/00
[52] U.S. Cl. ...................................... 361/101; 361/57; 361/56
[58] Field of Search ................ 359/265, 838, 884, 603, 359/604, 608; 323/266, 268, 282, 350; 361/18, 23, 31, 57, 101, 56, 79, 86, 88

[56] References Cited

U.S. PATENT DOCUMENTS

| | | | |
|---|---|---|---|
| 3,601,614 | 5/1970 | Platzer | 250/206 |
| 3,680,951 | 8/1972 | Jordan et al. | 350/279 |
| 4,161,760 | 7/1979 | Valentine | 361/18 |
| 4,443,057 | 4/1984 | Bauer et al. | 350/281 |
| 4,512,637 | 4/1985 | Ballmer | 350/357 |
| 4,529,275 | 7/1985 | Ballmer | 350/357 |
| 4,529,873 | 7/1985 | Ballmer et al. | 250/201 |
| 4,572,619 | 2/1986 | Reininger et al. | 350/392 |
| 4,603,946 | 8/1986 | Kato et al. | 350/331 |
| 4,623,222 | 11/1986 | Itoh et al. | 350/331 |
| 4,632,509 | 12/1986 | Ohmi et al. | 350/283 |
| 4,669,825 | 6/1987 | Itoh et al. | 350/332 |
| 4,669,826 | 6/1987 | Itoh et al. | 350/331 |
| 4,671,615 | 6/1987 | Fukada et al. | 350/331 |
| 4,676,601 | 7/1987 | Itoh et al. | 350/331 |
| 4,690,508 | 9/1987 | Jacob | 350/331 |
| 4,701,022 | 10/1987 | Jacob | 350/278 |
| 4,741,603 | 5/1988 | Miyagi et al. | 350/357 |
| 4,793,690 | 12/1988 | Gahan et al. | 350/279 |
| 4,886,960 | 12/1989 | Molyneux et al. | 250/209 |
| 4,896,030 | 1/1990 | Miyaji | 250/201 |
| 4,917,477 | 4/1990 | Bechtel et al. | 350/357 |
| 5,216,351 | 6/1993 | Shimoda | 323/266 |

FOREIGN PATENT DOCUMENTS

| | | |
|---|---|---|
| 0426503 | 5/1991 | European Pat. Off. |
| 2513198 | 3/1983 | France |
| 2808260 | 8/1979 | Germany |
| 3041692A1 | 5/1981 | Germany |
| 57-173801 | 10/1982 | Japan |
| 57-208530 | 12/1982 | Japan |
| 57-208531 | 12/1982 | Japan |
| 59-51301 | 4/1984 | Japan |
| 59-51325 | 4/1984 | Japan |
| 61-54942 | 4/1986 | Japan |
| 61-56638 | 4/1986 | Japan |
| 2029343 | 3/1980 | United Kingdom |
| 2119087 | 11/1983 | United Kingdom |
| 2156295 | 10/1985 | United Kingdom |

Primary Examiner—A. D. Pellinen
Assistant Examiner—Ronald W. Leja
Attorney, Agent, or Firm—Price, Henveld, Cooper, Dewitt & Litton

[57] ABSTRACT

A drive circuit for the interior, and one or more of the exterior, mirrors in a vehicle mirror system provides a drive signal to each of the mirrors to establish the reflectance level of that mirror. Circuit protection is provided to sense a fault condition on one of the electrical conductors extending to the exterior mirrors and to take corrective action in response to a fault condition. The circuit protection may also respond to a fault condition in the electrical supply of the drive circuit and take suitable corrective action. In certain embodiments, each mirror in the mirror system is responsive to one of a plurality of output amplifiers, which is responsive to a distinct desired reflectance signal level in order to color that mirror to a reflectance level that is distinct from that of the other mirrors. In other embodiments, separate drive circuits and associated power conditioning means are provided for each mirror so that the disabling of one mirror will not preclude the other mirror(s) in the system from providing glare protection.

50 Claims, 7 Drawing Sheets

FAULT TOLERANT DRIVE CIRCUIT FOR ELECTROCHROMIC MIRROR SYSTEM

This is a continuation of application Ser. No. 07/746,361 filed on Aug. 16, 1991, now abandoned.

BACKGROUND OF THE INVENTION

This invention relates generally to automatic rearview mirror systems for vehicles and more particularly to mirror systems in which the exterior mirrors are glare protected. The invention is especially adapted to electrochromic mirror systems.

Automatic rearview mirror systems have been developed in which either all solid-state electrochromic elements or electrochemichromic cells are colored by a drive signal to modify the reflectance level of the mirror, under the control of a drive circuit, in order to reduce the glare reflected to the driver. While initially applied to the interior mirror of the vehicle, such glare-protected mirrors soon found application in the exterior mirrors mounted on the driver's door and the passenger's door. It has been found convenient to provide drive signals to the two exterior mirrors and to the interior mirror, if provided, from a common drive circuit, typically located within the interior of the vehicle, in order to avoid duplication of components.

Electrochromic elements typically operate at a maximum voltage level of about 1.2 to 1.8 volts. In one type of electrochromic mirror system disclosed in commonly assigned copending patent application Ser. No. 07/643,186, filed Jan. 18, 1991, by Niall R. Lynam for an ELECTROCHROMIC MIRROR FOR VEHICLES, a heater is provided for the electrochromic element in order to provide a uniform reflectivity level across substantially the entire mirror surface irrespective of the outdoor temperature. Such a heater is operated at battery or ignition voltage levels, which are typically between 12 volts and 16 volts DC. Accordingly, when an exterior mirror is removed for repair or replacement, the mirror system is subject to inadvertent mishap. For example, the drive leads extending to the electrochromic element may be shorted together or shorted to ground. Worse, the 12–16 volt DC supply leads extending the mirror heater may inadvertently contact the exposed terminals of the electrochromic element drive lines extending from the exterior mirror housing back to the interior mirror housing. Any such mishap would likely cause damage to the drive circuit or to any mirror in the system then in use.

The combination of two or three electrochromic elements in a vehicle mirror system provides additional difficulties. The drive circuit for one mirror requires a voltage regulator that provides adequate voltage regulation with minimal excess current drain. The extra current required to drive the additional mirror(s), within the voltage range required for a full range of mirror reflectance levels, would require a conventional voltage regulator that has much greater capacity. This increase in capacity would result in excessive power dissipation in the form of heat to provide adequate voltage regulation. This difficulty is further aggravated by the necessity of proper mirror operation under conditions in which the supply voltage to the mirror system is abnormally low.

The traditional approach to driving the mirrors in an automatic rearview mirror system in which both the interior and exterior mirrors are dimmed in response to glare-producing light, is to operate all three mirrors in electrical parallel connection from the same drive circuit. This provides circuit economy and recognizes the fact that all mirrors will experience glare-producing light simultaneously. However, the glare reflected to the driver's eyes from each mirror is different because of the difference in physical relationship between the driver and each mirror. Accordingly, it is desirable to be able to decouple the operation of the mirrors in an automatic rearview mirror in order to recognize the reality of the different responses of each mirror to the same glareproducing light, when viewed from the driver.

SUMMARY OF THE INVENTION

The present invention provides a drive circuit for one or more exterior mirrors and an interior mirror, if provided, in a vehicle mirror system that is exceptionally tolerant to faults that are likely to occur at the exterior mirror housing, especially during replacement of the exterior mirror.

According to a first aspect of the invention, a rearview mirror system for a vehicle, including at least one exterior mirror positioned outside the vehicle passenger compartment, is provided with a drive circuit to supply a drive signal to the mirror to establish the reflectance level of that mirror including electrical conductors to conduct a drive signal to the mirror. The drive circuit includes a desired reflectance level determining means for producing a signal indicative of a desired reflectance level and output drive means, responsive to the desired reflectance level signal, for producing a drive signal that is applied to the mirror. Electrical supply means supply electrical energy to the output drive means and circuit protection means are provided for sensing a fault condition on one of the electrical conductors and taking corrective action in response to a fault condition that reduces damage caused by the fault condition. The circuit protection means may also respond to a fault condition in the electrical supply means or in the drive circuit and take corrective action.

According to another aspect of the invention, fault sensor means are provided for sensing a fault condition on one of the conductors conducting a drive signal to the mirror. Disconnect means are provided that are responsive to one or both fault sensor means for removing electrical energy from the drive means when one or more fault means senses a fault condition. This, in combination with other unique circuit features, provides circuit protection means for responding to many fault conditions.

According to another aspect of the invention, the desired reflectance level determining means may produce a plurality of distinct signal levels, each signal level indicative of a desired reflectance level for one of the mirrors. A plurality of output drive means are provided, each drive means being responsive to one of the distinct signal levels in order to produce a drive signal that is applied to a particular mirror and including circuit protection means for sensing a fault condition on one of the conductors connecting a drive signal to a particular mirror. Each mirror is adaptable to being colored to a reflectance level that is distinct from that of the other mirrors in the rearview mirror system.

According to yet another aspect of the invention, the electrical energy supply means for a rearview mirror system for a vehicle includes an input terminal adapted to be connected with a source of electrical energy and voltage regulating means responsive to the input terminal for regulating the voltage level of the electrical energy supplied to the drive means. The voltage regulating means includes first and second power conditioners that are serially connected between the input terminal and the drive means. A supply voltage input terminal of the first power conditioner is connected with the input terminal and the supply voltage input of the second power conditioner is connected with the regulated voltage output of the first power conditioner. The regulated voltage output of the second power conditioner is applied to the drive means. In this manner, a more stable voltage is available to the drive means with less quiescent current draw than a conventional monolithic low voltage dropout regulator. Because the voltage regulating function is divided serially between two power conditioners, each of which drops and regulates a portion of the supply voltage, better voltage regulation is provided and heat dissipation is distributed over several circuit elements.

These and other objects, advantages and features of this invention will become apparent upon review of the following specification in conjunction with the drawings.

DESCRIPTION OF THE PREFERRED EMBODIMENT

Figure 1:
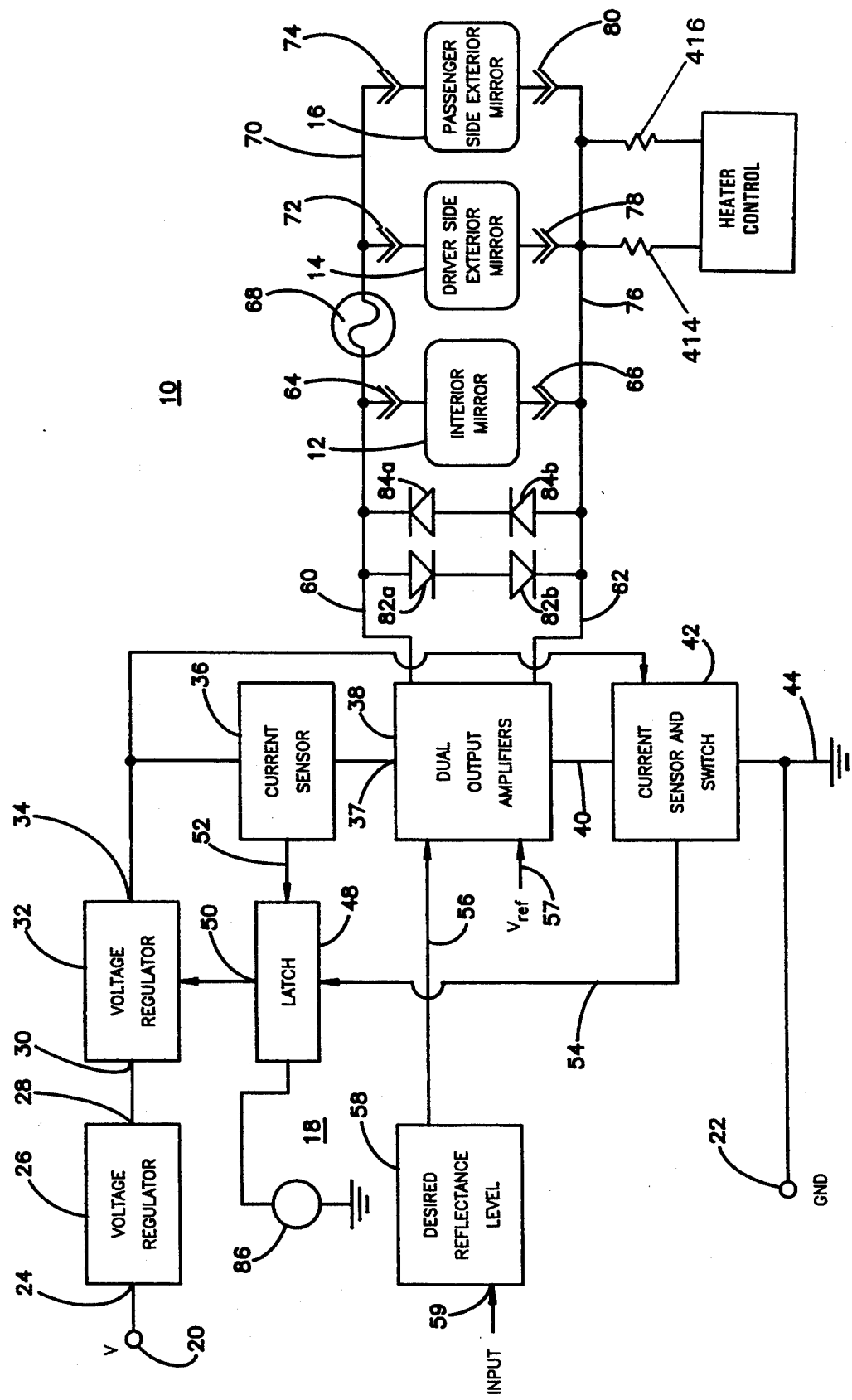
FIG. 1 is a block diagram of a fault tolerant drive circuit for an electrochromic mirror system according to the invention.

Referring now specifically to the drawings, and the illustrative embodiments depicted therein, a vehicle mirror system 10 includes a first exterior mirror 14 positioned on the driver's side of the vehicle exterior the passenger compartment, a second exterior mirror 16 positioned on the passenger side of the vehicle exterior the passenger compartment, an optional interior mirror 12 positioned within the passenger compartment of the vehicle and a drive circuit 18 for providing drive signals to mirrors 12, 14 and 16 (FIG. 1). Mirrors 12, 14 and 16 have electrochromic reflectance elements which color to a desired reflectance level in proportion to a drive signal produced by circuit 18. Mirrors 12, 14 and 16 are preferably of the all solid-state type disclosed in commonly-assigned U.S. patent application Ser. No. 4,712,879 issued to Niall R. Lynam for an ELECTROCHROMIC MIRROR. Alternatively, mirrors 12, 14 and 16 may be of the electrochemichromic cell type, such as disclosed in commonly-assigned U.S. patent application Ser. No. 07/443,113 filed Nov. 29, 1989 for HIGH PERFORMANCE ELECTROCHEMICHROMIC SOLUTIONS AND DEVICES THEREFORE invented by Desaraju V. Varaprasad, Niall R. Lynam, Hamid R. Habibi and Padma Desaraju.

Drive circuit 18 includes a first input terminal 20 connected to a source of voltage, such as ignition voltage, which is typically approximately 16 volts DC, or battery voltage, which is typically approximately 12 volts DC and a second input terminal 22 which is connected to ground, or vehicle chassis 44. Input terminal 20 is connected with the power input port 24 of a first power conditioning means, or voltage regulator, 26, which produces a regulated voltage on its regulated voltage output port 28. Output port 28 is, in turn, connected with the power input port 30 of a second power conditioning means, or voltage regulator, 32. A regulated output port 34 of voltage regulator 32 is supplied through a current sensor 36 to a positive supply terminal 37 of a dual output amplifier package 38. Amplifier package 38 includes a pair of matched differential input operational amplifiers, such a Model No. L272M manufactured by SGS Thompson and Model No. TCA0372DP2 manufactured by Motorola. A negative power supply terminal 40 of output amplifier package 38 is connected through a combination current sensor and switch 42 to ground 44.

A latch circuit 48 includes an output 50 that is capable of removing power from dual amplifier package 38 by forcing voltage regulator 32 to produce a zero output voltage on its output port 34. Latch 48 is set by a set line 52 extending from current sensor 36, in response to the current sensed by current sensor 36 exceeding a predetermined level. Latch 48 may additionally be set by a line 54 extending from current sensor and switch 42 in response to the current sensed by sensor and switch 42 exceeding a predetermined level. When latch 48 forces the output of voltage regulator 32 to zero volts, current sensor and switch 42 is opened in response to the voltage level on line 34.

Dual output amplifiers 38 receive a first input signal on line 56 produced by a desired reflectance level circuit 58. Circuit 58 receives an input 59 that may be a manual selection on input means provided to the driver for manually selecting a desired reflectance level of the mirrors, or glare and ambient light sensors to automatically establish the reflectance level of the mirrors as a function of ambient and glare light levels. Dual output amplifiers 38 additionally receive a reference voltage on an input line 57. Output amplifiers 38 produce mirror drive signal on a pair of output lines 60, 62. The voltage across lines 60, 62 produced by amplifiers 38 is a function of the difference between the signal on input line 56 and the reference voltage on line 57.

Both output lines 60 and 62 actively carry a voltage signal. This allows both positive and negative relative drive signals to be applied to mirrors 12, 14 and 16 by allowing line 60 to have a lower positive voltage than line 62. Output line 60 is connected through an electrical terminal 64 to mirror 12 and line 62 is connected through an electrical terminal 66 to mirror 12. Line 60 is additionally connected, through a fuse 68 to an electrical conductor 70 extending to the exterior of the vehicle and, in turn, to mirror 14, through terminal 72, and to mirror 16, through terminal 74. Line 62 extends, through an electrical conductor 76, to the exterior of the vehicle and, in turn, to mirror 14, through terminal 78, and mirror 16, through terminal 80. A first pair of serially connected diodes 82a, 82b and a second pair of oppositely polled serially connected diodes 84a, 84b are connected across output lines 60 and 62.

Vehicle mirror system 10 provides the same drive signal to exterior mirrors 14 and 16 that is provided to interior mirror 12. This is a result of mirrors 12, 14 and 16 being connected in electrical parallel with each other. Therefore, when one of the exterior mirrors 14, 16 is removed, its respective terminals 72, 78 or 74, 80 are exposed and subject to various fault conditions. For example, with respect to mirror 16, terminals 74 and 80 could be shorted together or either one could be individually shorted to ground 44. Alternatively, a foreign source of voltage, such as ignition voltage (16 volts DC) or battery voltage (12 volts DC) could be inadvertently connected with terminal 74 or 80. This occurrence is made more likely because of the existence of a mirror heater (not shown) in the same package as mirror 16 which requires such relatively high voltage. Any fault experienced at terminals 74, 80 will be reflected through conductors 70 and 76 to output lines 60 and 62 of amplifier package 38.

In operation, voltage regulator 26 provides a regulated voltage on its output 28 that is approximately 7.3 V and voltage regulator 32, which receives 7.3 V at its input 30, produces a regulated voltage at its output 34 of approximately 5.3 V, although the precise values depend upon the value of input voltage V and the requirements of the components of drive circuit 18. The regulated voltage at output 34, when applied to output amplifiers 38, produces a current that is sensed by current sensor 36 and current sensor and switch 42. This current is relatively small in mirror bleached condition and significantly higher in color conditions. Abnormal high current levels are sensed due to faults which would be higher than the worst case color conditions.

Under normal conditions, latch 48 is reset. If a fault condition is produced that results in line 70 or 76 being shorted to ground 44, or shorted together, this will create an increase in the current sensed by current sensor 36. This will produce a signal on output line 52 causing latch 48 to be set. When latch 48 is set, it produces an output on its line 50 which inhibits voltage regulator 32, such that zero volts are produced on output 34. This reduces the current sensed by current sensor 36. Additionally, the reduction of voltage on line 34 causes current sensor and switch 42 to open, which interrupts any current from negative power supply terminal 40 flowing to ground 44. Therefore, when latch 48 is set, both power supply leads are removed from dual amplifier package 38 in order to avoid damage to the amplifiers from the short between the conductors 70, 76 or the shorting of either conductor to ground or the application of a foreign voltage to either conductor 70, 76. The setting of latch 48 produces an indication on an indicator 86 of the fault condition. Latch 48 will stay set until power is removed from terminals 20, 22 and, hence from circuit 18. If the fault condition remains upon the re-energization of circuit 18, the latch 48 will once again be set, removing power from amplifiers 38 and illuminating indicator 86. If the fault has been removed, however, the re-energization of drive circuit 18 will provide normal operation of mirror system 10.

If a foreign voltage source, such as ignition voltage (16 VDC) or battery voltage (12 VDC) is applied across electrical terminals 72, 78 or 74, 80 extending to mirrors 14 and 16, this voltage will produce a sharp rise in current through diodes 82a, 82b or 84a, 84b. In order to avoid damage to these diodes, two means of protection are provided. The first means includes a disconnect device, or fuse, 68 that is provided between output line 60 and conductor 70. In the illustrated embodiment, fuse 68 is a 1.0 amp quick-acting replaceable fuse. Such devices are commercially available and marketed by Wickman U.S.A., Inc. under Model No. TR3-F#19300K. Alternatively, fuse 68 may be a PTC thermister. Such devices that were previously commercially available were found to be too slow in operation in order to avoid damage to diodes 82a, 82b and 84a, 84b. However, more recent commercial units have been found to be adequate in response time. For example, PTC Polyswitches manufactured by Raychem under Model RXE110, switch from a fraction of an ohm impedance during low current conditions to several kiloohms under high current conditions in on the order of a fraction of a second. Because the PTC thermister is automatically resetting without manual intervention, it is preferred.

The second means of protection responds to immediate increase in current that will be produced from negative power supply terminal 40 to ground 44. This increase in current will be detected by current switch and sensor 42 which will cause latch 48 to be set via line 54. The setting of latch 48 will, in turn, inhibit voltage regulator 32, which will, in turn, cause current sensor and switch 42 to open. The result is that power is removed from dual amplifier package 38 and the path from conductor 76 to ground is opened.

Another possible fault condition that could be detrimental to mirror system 10 is a failure of voltage regulators 26 or 32, tending to cause an increase in the supply voltage provided to the voltage dividers that establish, in part, the output levels produced by amplifiers 108 and 110 on output lines 60, 62. Also, an internal failure in amplifier 38, such as an open between one output terminal and the inverting terminal, would cause the output voltage on lines 60, 62 to swing to the positive supply voltage V. The resulting tendency for the voltage across output lines 60, 62 to increase to the level of the full color voltage and bleach voltage of the cell will be prevented by back-to-back diode sets 82a, 82b and 84a, 84b. Such arrangement prevents the voltage across line 60, 62 from increasing beyond a level greater than two forward-biased diode drops, which, in the illustrated embodiment, is approximately 1.5 volts. Because output lines 60 and 62 will be clamped at 1.5 volts, the excessive voltage will create an increase in current supplied to output amplifier package 38 because the break down voltage of the diodes will be exceeded and excessive current is allowed to flow through them because the current limiting resistance of the diodes is reduced at break down. This increase in current will be sensed by current sensor 36. The result will be a setting of latch 48 which will inhibit voltage regulator 32 and cause current sensor and switch 42 to open. This will remove the power from output amplifiers 38.

Vehicle mirror system 10, including drive circuit 18, has the advantage that the voltage applied to mirrors 12, 14 and 16 may be both positive and negative, with respect to the terminals of the mirrors, in order to provide exceptionally rapid speed of both coloration and bleaching of the mirrors. This is provided in a system that requires only a positive input voltage V in accordance with the teaching of commonly assigned, copending application Ser. No. 07/431,284 filed Nov. 3, 1989 for a DRIVE CIRCUIT FOR AN ELECTROCHROMIC CELL by Thomas D. Gaffney and Kenneth L. Schierbeek, the disclosure of which is hereby incorporated herein by reference. The requirement that output line 62 be operated at a voltage other than ground, is accommodated by the unique circuit protection means illustrated herein in FIG. 1. Furthermore, various faults that may be anticipated during the replacement of an exterior mirror 14 or 16, or by failure of components in the drive circuit 18, are detected and responded to in a manner that avoids damage to the mirror system 10. Furthermore, exceptional stability in the supply of electrical power to dual output amplifier package 38 is provided by the unique arrangement of voltage regulators 26 and 32, in order to provide sufficient drive current to mirrors 12, 14 and 16. This is accomplished even during low-voltage conditions in which input voltage V is substantially reduced in magnitude. Furthermore, the use of multiple power conditioning means to provide drive current to the mirrors distributes the least dissipation among multiple circuit components.

Figure 2:
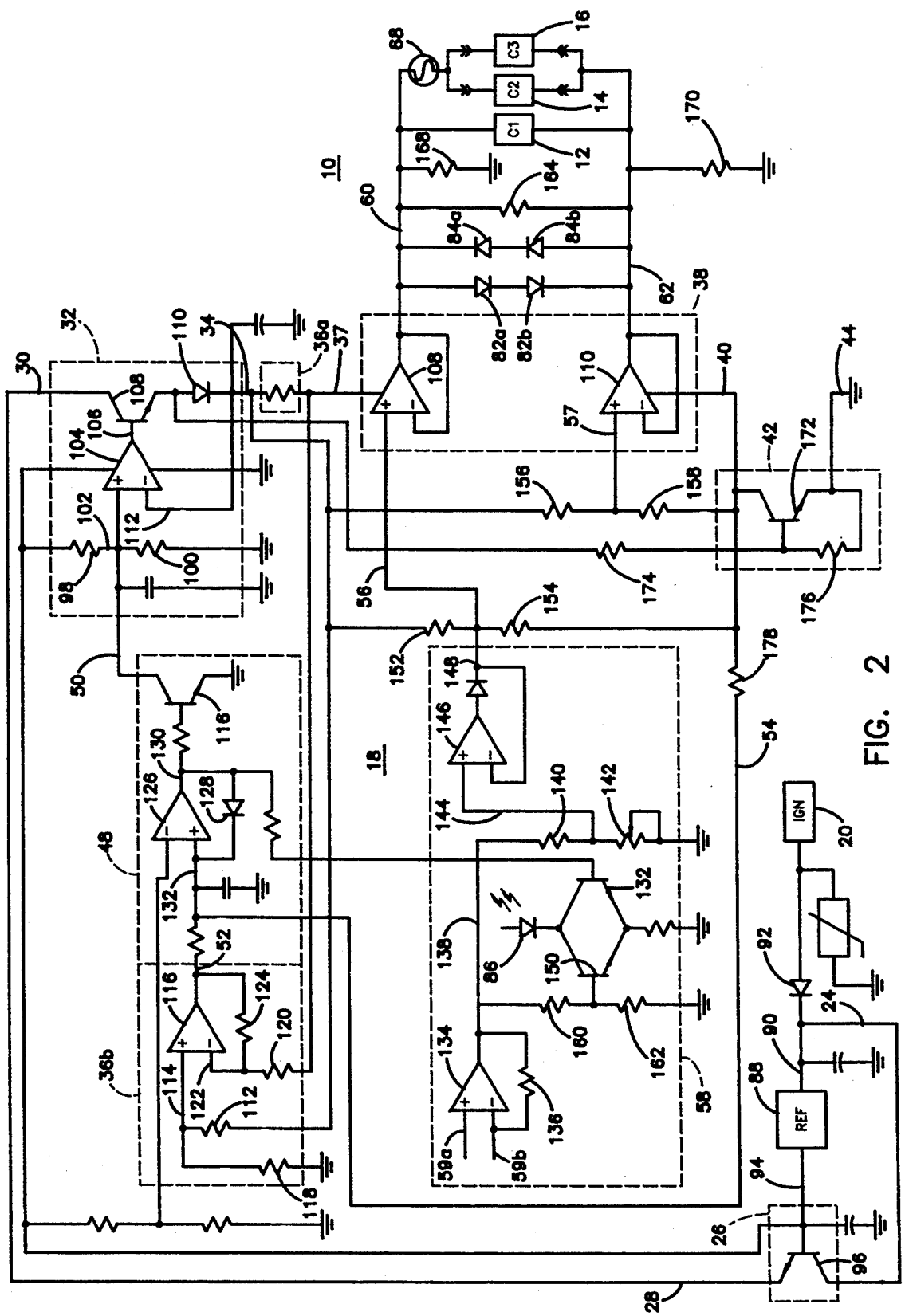
FIG. 2 is a schematic diagram of the circuit in FIG. 1.

In order to provide reference voltages for voltage regulators 26 and 32, a constant voltage generator 88 is provided having an input 90 connected, through a diode 92, to input terminal 20 (FIG. 2). The purpose of diode 92 is to protect against a reverse-polarity source being applied to terminal 20. Constant voltage generator 88, which is a low-dropout regulator, produces a reference voltage output 94 which is supplied to the base of a power transistor 96 and to a voltage divider including resistors 98 and 100. The junction 102 between resistors 98 and 100 is provided to the non-inverting input of an amplifier 104. An output 106 of amplifier 104 is provided to the base of a second power transistor 108, whose emitter is connected, through a diode 110, to the inverting input 112 of amplifier 104. The emitter of transistor 96, which is output 28 of first voltage regulator 26, is connected with the collector of transistor 108, which is input 30 to second voltage regulator 32.

Constant voltage generator 88 is configured to provide a constant reference voltage on output 94 that is substantially equivalent to the regulated voltage desired on output 28 of first voltage regulator 26 plus one P/N junction drop. This reference voltage is divided by the voltage divider including resistors 98, 100 to a scaled voltage at junction 102, which is substantially equivalent to the voltage desired on regulated output port 34 of second voltage regulator 32. Junction 102 is additionally connected to the collector of a transistor 116, whose emitter is connected to ground. With this arrangement, output port 28 will be maintained at a constant voltage level, as established by the reference output 94 of constant voltage source 88. The voltage on output port 34 of voltage regulator 32 will be substantially equal to the voltage level on output 106 of amplifier 104 minus 2 P/N junction drops. If transistor 116 is not conducting, the voltage on output 106 will be substantially equal to the reference voltage on junction 102, established by the reference voltage 94 and the ratio of resistors 98 and 100. If, however, transistor 116 is switched into conduction by the application of a high signal to its base, the voltage at junction 102 will be pulled substantially to ground which will, in turn, cause output 106 to be substantially at ground and the voltage at the regulated output port 34 of voltage regulator 32 to be substantially zero. Therefore, transistor 116 functions as a switch to remove power from dual output amplifier package 38, when it is placed into conduction. In the illustrated embodiment, constant voltage generator 88 is a commercially available low-dropout voltage regulator sold under standard part no. LM2940T and transistors 96 and 108 are type TIP29 power transistors.

Current sensor 36 includes a low-impedance (such as 0.5 ohm) resistance 36a in series with regulated output port 34 and the positive supply terminal of amplifiers 108 and 110, which make up dual output amplifier package 38. The regulated output port 34 side of impedance 36a is connected through a resistor 112 to the non-inverting input 114 of an amplifier 116 which defines a reference level portion 36b of current sensor 36. The supply terminal 37 side of impedance 36a is connected through a resistor 120 to the inverting input 122 of amplifier 116. Input 114 is connected through a resistor 118 to ground, and a feedback resistor 124 is provided between output line 52 and input 122. Amplifier 116 is arranged as a difference amplifier to measure the voltage across impedance 36a and to switch output 52 if the voltage across its terminals 114, 122, which is proportional to the current through impedance device, exceeds a predetermined level. Resistors 112, 118, 120 and 124 establish the gain of amplifier 116.

Output 52 is connected with a non-inverting input 132 of an amplifier 126, which is configured as a latch by the provision of a diode 128 in positive feedback connection from its output 130 to its non-inverting input 132. Accordingly, whenever set line 52 exceeds a predetermined level in response to the current through impedance device 36a exceeding a predetermined level, input 132 becomes higher than the inverting terminal and output 130 is forced into a positive state. This switches transistor 116 into a conducting state and inhibits voltage regulator 32 by forcing its output to zero volts. A high output 130 also causes diode 128 to conduct and the latch state is held because input 132 is higher than the inverting input. This condition continues as long as power is supplied to the circuit 18. Output 130 is additionally connected to the base of a transistor 132 which is connected in switching arrangement with an indicator, or light emitting diode, 86. Therefore, whenever voltage regulator 32 is being inhibited by latch 48, indicator 86 will be illuminated.

Desired reflectance level circuit 58 includes an amplifier 134 having a positive input 59a, a subtracting input 59b and a gain-establishing feedback resistor 136. Inputs 59a, 59b may be supplied with signals representing glare and ambient light levels, such as disclosed in the aforementioned copending Gaffney et al. patent application for a DRIVE CIRCUIT FOR AN ELECTROCHROMIC CELL, or may be inputs received from driver actuatable selection switches, or the like. When the non-inverting input is greater then the inverting input, a positive signal is present on output 138. When the non-inverting is less then the inverting input, the negative supply voltage, which is 0 V or ground, is present on output 138. An output 138 of amplifier 134 is provided to a scaling circuit, including resistors 140 and 142, to establish a signal on junction 144 provided to a unity gain amplifier 146. The output 148 of amplifier 146 is provided to an adder circuit including resistors 152 and 154 connected in series from regulated output port 34 to ground. The purpose of this adder is to provide a constant offset to the signal level on output 148 prior to line 56 applied to the non-inverting input of amplifier 108. This offset balances a constant offset provided to output line 62 by reference level 57. Reference level 57 is established by a voltage divider made by resistors 156 and 158 connected in series between port 34 and ground. In this manner, when the signals applied to input lines 59a and 59b are equal, the input on line 56 to amplifier 108 will substantially balance the offset on line 57 supplied to amplifier 110 in order to provide a slightly negative voltage (approximately 100 mv) across output lines 60, 62. As the magnitude of the signal on input 59b decreases below that on input 59a, in a glare situation, the difference in voltage across lines 60 and 62 will become more positive to increase the coloration of the mirror. If the input on line 59b becomes greater than that on 59a, the voltage across line 60 and 62 will be negative with respect to the mirrors to bleach the mirror.

A transistor 150, connected in parallel with transistor 132, is biased by resistors 160, 162 to illuminate indicator 86 in proportion to the degree of coloration of mirrors 12, 14 and 16. In this manner, indicator 86 performs the dual function of indicating the degree of mirror coloration as well as a fault condition. The difference between these functions will become apparent to the driver because, for a fault condition, indicator 86 will be fully illuminated but the mirrors will be fully bleached by a resistor 164 across lines 60, 62 which bleaches the mirrors when power is removed from amplifier package 38. Resistors 168 and 170 are provided for dissipation of any static charge that may accumulate on lines 60 and 62.

Current sensor and switch 42 includes a transistor 172 having its collector connected with negative power supply terminal 40 of amplifier package 38 and its emitter connected with ground 44. The base of transistor 172 is connected through a resistor 174 to the emitter of transistor 108. A resistor 176 between the base of transistor 172 and ground is a bias resistor. Negative power supply terminal 40 is connected through a high impedance resistor 178 to line 54 extending to input 132 of amplifier 126. With this arrangement, whenever the current from negative power supply terminal 40 increases substantially, the collector-emitter voltage of transistor 172 increases in nonlinear proportion. As this current continues to increase, the voltage on line 54 may become sufficiently large to force input 132 to a level that will cause amplifier 126 to switch its output 130 to a positive state. This, in turn, causes transistor 116 to become conducting which inhibits voltage regulator 32. When voltage regulator 32 is inhibited, the reduction in its output to zero volts causes the voltage supplied to the base of transistor 172 through resistor 174 to become low, which switches transistor 172 into a nonconducting state. This interrupts the current flowing to ground through negative supply terminal 40 and transistor 172. Therefore, if any condition causes latch 48 to be set, which disables voltage regulator 32 in order to disconnect power to amplifier package 38, current sensor and switch 42 will also be opened in order to interrupt the negative power supply line. As previously set forth, this is especially important for a fault condition in which a foreign voltage is applied to output line 62 or 60. Such fault condition will be reflected in a significant increase in the current from negative supply terminal 40 to ground, which will be both detected and interrupted by current sensor and switch 42, which will also cause the positive voltage supply through regulator 32 to be removed from amplifier package 38.

Figure 3:
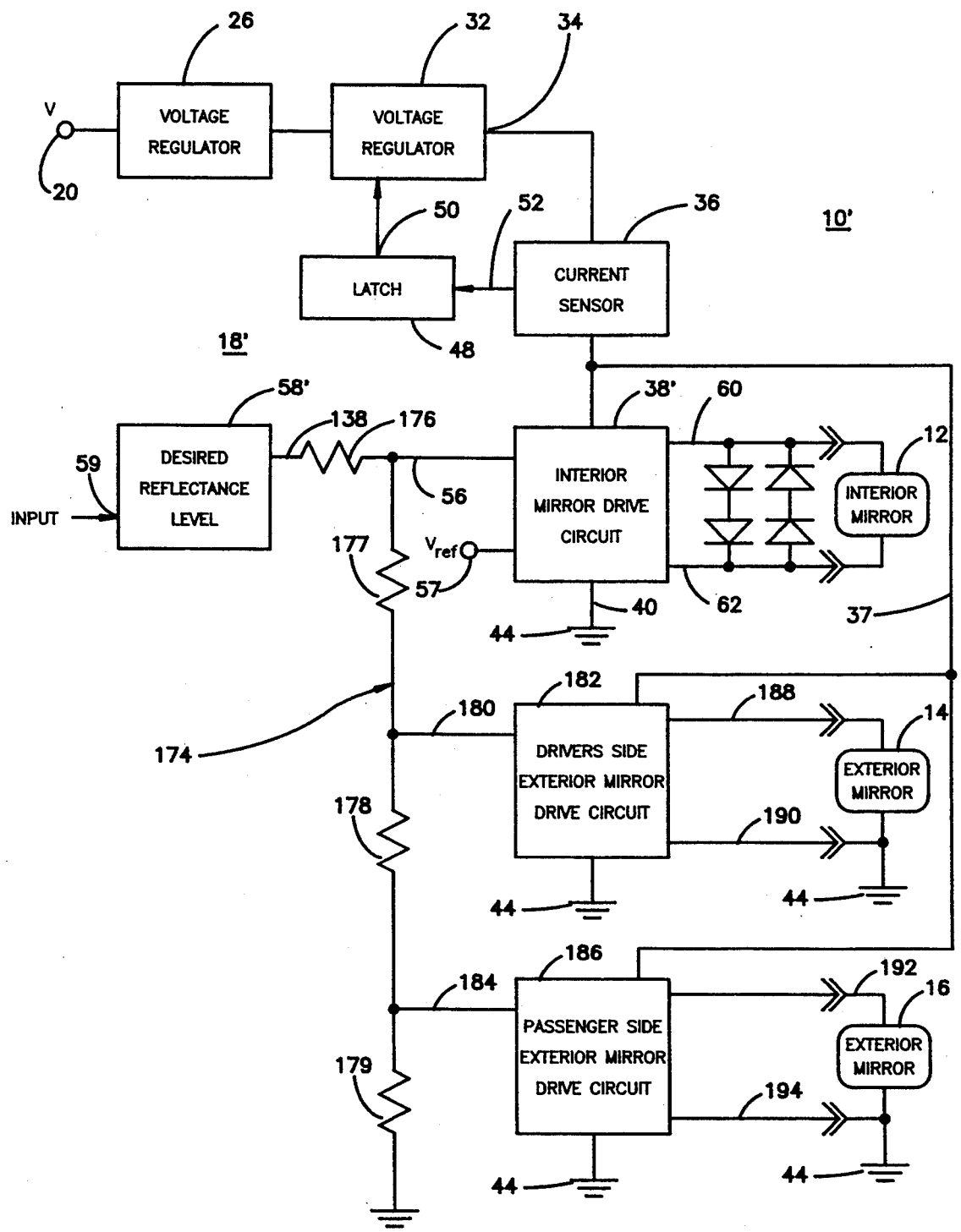
FIG. 3 is an alternative embodiment of a fault tolerant drive circuit for an electrochromic mirror system.

An alternative embodiment of the vehicle mirror system, indicated generally at 10', is adapted to coloring interior mirror 12 and each exterior mirror 14, 16 to a different reflectance level (FIG. 3). The reason is that the amount of glare reflected from a common source to the eyes of a driver differs for each mirror. In order to accomplish this, output line 138 of desired reflectance level circuit 58' is connected to a voltage dividing network 174 including resistors 176, 177, 178 and 179 connected in series between output 138 and ground. The junction between resistors 176 and 177 is connected with line 56 providing the desired reflectance level signal to interior mirror drive circuit 38'. The junction 180 between resistors 177 and 178 is provided as an input to a driver's side exterior mirror drive circuit 182 and the junction 184 between resistors 178 and 179 is provided as the desired reflectance level input to a passenger side exterior mirror drive circuit 186. Driver's side exterior mirror drive circuit 182 includes output lines 188 and 190 extending to driver's side exterior mirror 14, with line 190 being connected with ground 44. Passenger side exterior mirror drive circuit 186 is connected to passenger side exterior mirror with lines 192 and 194, with line 194 being connected with ground 44. Mirror drive circuits 38', 182 and 186 are supplied with electrical energy through connection with positive supply terminal 37 and connection with ground 44.

For a given level of output from desired reflectance level circuit 58', the desired reflectance level signal supplied at 56, 180 and 184 respectively to interior mirror drive circuit 38', driver side exterior mirror drive circuit 182 and passenger side exterior drive circuit 186, respectively, will be different. The reflectance level of the interior mirror 12 will be less than that of driver side mirror 14, which will be less than that of passenger side mirror 16. While the ratio of reflectance levels may depend upon the geometry of the vehicle, size of the mirrors and other factors, in the illustrated embodiment the ratio of reflectance levels of the passenger side exterior mirror, interior mirror and driver side exterior mirror is approximately 10:6:8, respectively, in terms of percent reflection. As will be set forth in more detail below, circuit protection means are provided in an efficient and economic manner in order to protect drive circuit 18' from the same fault conditions from which drive circuit 18 (FIGS. 1 and 2) is protected Interior mirror drive circuit 38', for supplying the drive signal to interior mirror 12 does not include fuse 68 or current sensor and switch 42. Because the exterior mirrors 14, 16 are not connected in parallel with interior mirror 12, the fault conditions that required fuse 68 and current sensor end switch 42 are not experienced by interior mirror drive circuit 38'. However, the combination of diode branches 82a, 82b and 84a, 84b across mirror 12 in combination with current sensor 36 will protect against the fault condition in which a circuit failure within drive circuit 18' causes positive supply terminal 37 to be forced to an excessively high value, such as V. If this occurs, the parallel diode paths will limit the voltage across mirror 12 to approximately 1.5 volts and will create an excessive current that will be sensed by current sensor 36, which will disable voltage regulator 32 through latch 48.

Figure 4:
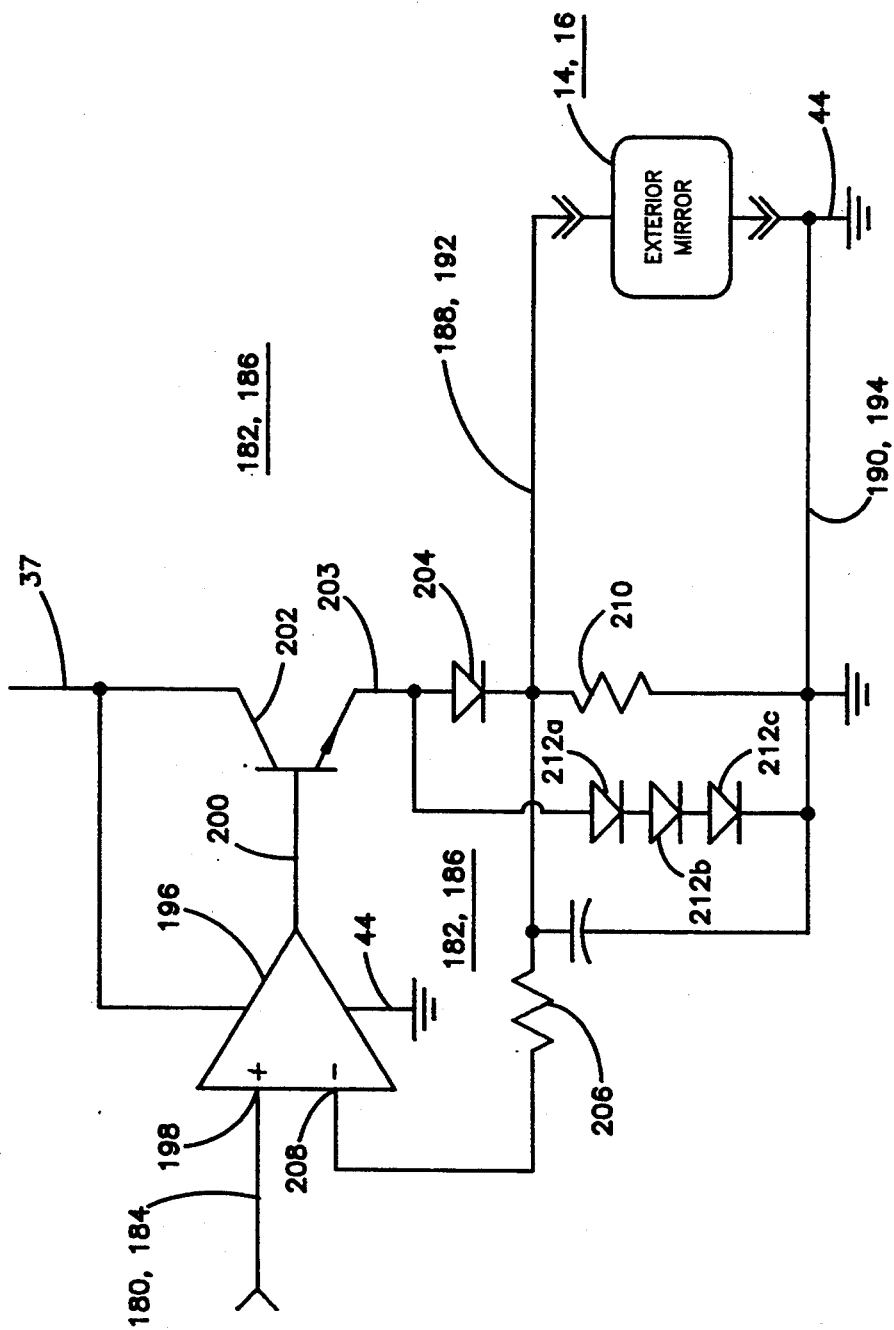
FIG. 4 is an electrical schematic diagram of a drive circuit for an exterior mirror, useful in FIG. 3.

Each exterior mirror drive circuit 182, 186 includes an amplifier 196 which is connected, for the purposes of being supplied with power, between positive supply terminal 37 and ground 44 (FIG. 4). Amplifier 196 includes a non-inverting input 198 which is connected with the respective desired reflectance level junction 180, 184. Amplifier 196 additionally includes an output 200 that is connected to the base of a transistor 202, whose collector is connected to positive supply terminal 37. The emitter 203 of transistor 202 is connected with the anode of diode 204 to output line 188, 192 extending to the respective exterior mirror 14, 16. Output line 188, 192 additionally extends through a high-impedance resistor 206 to the inverting input 208 of amplifier 196. A medium-low impedance device 210 is connected from output line 188, 192 to output line 190, 194, which also extends to the respective exterior mirror 14, 16. In contrast to the drive circuit illustrated in FIGS. 1 and 2, in which both output drive lines extending to the mirrors were supplied with a voltage and, hence, were not grounded, output line 190, 194 is connected with ground 44. A series path of diodes 212a, 212b and 212c is connected between emitter 203 of transistor 202 and line 190, 194.

In operation, amplifier 196 produces a voltage on its output 200 that is substantially equal to the desired reflectance level supplied to its input 198 from junction 180, 184 plus 2 P/N junction drops. The resulting voltage produced on output line 188, 192 is equivalent to the voltage on junction 180, 184. Therefore, as the desired reflectance level supplied to line 180, 184 from desired reflectance level circuit 58' increases, the voltage on output line 188, 192 increases proportionately. If it is desired to rapidly bleach mirror 14, 16 to a high reflectance level utilizing drive circuit 182, 186, the desired reflectance level signal on line 180, 184 is decreased to substantially zero which causes the voltage across lines 188, 192 and 190, 194 to be substantially zero. Resistor 210 will bleed the charge off of the mirror 14, 16.

Exterior mirror drive circuit 182, 186 includes circuit protection against faults that may result from the removal of mirror 14, 16 and the shorting of lines 188, 192 and 190, 194 either together or to ground. Because line 190, 194 is already at ground potential, there is no detriment to its being shorted to ground. If line 188, 192 is shorted to ground, the current supplied from positive supply terminal 37 will significantly increase and cause current sensor 36 (FIG. 3) to produce an output on line 52 to latch 48 in order to inhibit voltage regulator 32 and, hence, disconnect power from drive circuit 18'. If a foreign voltage, such as ignition voltage (16 VDC) or battery voltage (12 VDC) is applied to line 188, 192, diode 204 will be reverse biased, precluding this increase in voltage on line 188, 192 from damaging remaining portions of circuit 18'.

Resistor 210 is selected to be in the one to three watt power range in order to dissipate the increase in power provided across this resistor from such foreign voltage. The resistance of resistor 210 is sufficiently high, 100 ohms, in order preclude the requirement for yet a higher wattage resistor. However, this is somewhat of a compromise level in that a lower resistance would be more desirable for rapid bleaching of exterior mirror 14, 16. As an alternative, a fuse (not shown) could be supplied in series with line 188, 192. This would allow the resistance of resistor 210 to be lowered to a fraction of an ohm in order to increase the rate of bleaching. If a foreign voltage is applied to drive line 190, 194, the fact that this line is grounded will cause a fuse or circuit breaker (not shown) associated with the foreign voltage source to blow but will not have any impact on circuit 18'. If a failure in voltage regulator 26 or 32 or in other component circuit 18' causes supply terminal 37 to rise to a detrimental level, the diode path 212a, 212b and 212c will clamp the voltage across mirror 14, 16 at approximately 1.5 volts. The resulting increase in current will be sensed by current sensor 36, which will set latch 48 to inhibit voltage regulator 32 in order to remove power from drive circuit 18'.

Figure 5:
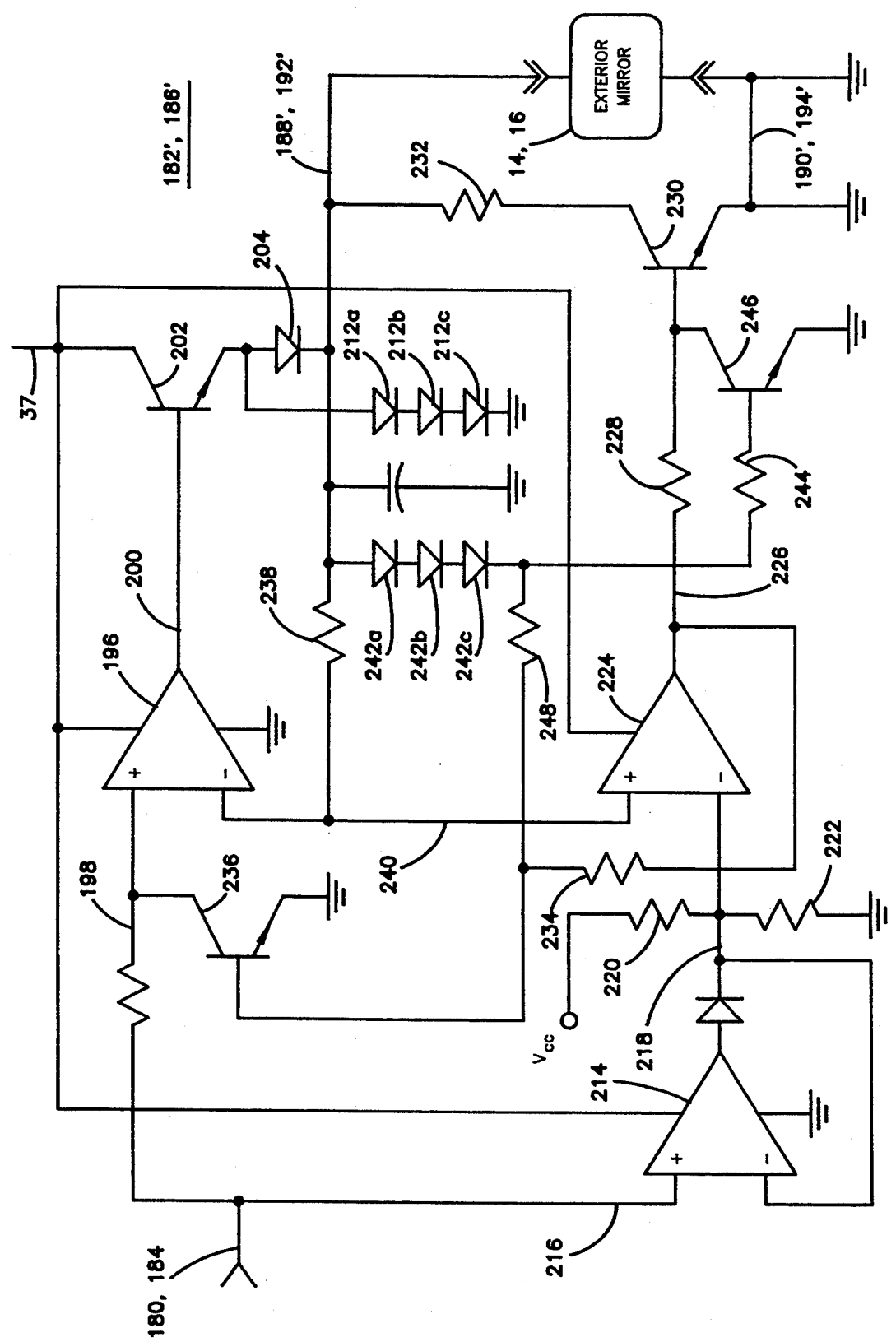
FIG. 5 is an electrical schematic diagram of an alternative exterior mirror drive circuit useful in FIG. 3.

An alternative exterior mirror drive circuit 182', 186' includes amplifier 196 and regulating transistor 202 arranged in the same manner as in drive circuit 182, 186 (FIG. 5). Likewise, diode 204 and diode path including diodes 212a, 212b and 212c are arranged and function in substantially the same manner as in FIG. 4. Drive circuit 182', 186' includes an amplifier 214 having a non-inverting input 216 connected with desired reflectance level signal junction 180, 184 and an output 218 connected with an adder network including a resistor 220 and 222 connected in series between a constant voltage source Vcc and ground. Output 218 is, in turn, connected with the inverting input of an amplifier 224, which has an output 226 connected through a resistor 228 to the base of a transistor 230. Transistor 230 has an collector-emitter junction in series with a one ohm, or less, resistor 232 connected between line 188', 192' and 190', 194'. Output 226 is additionally connected through a resistor 234 to the base of a transistor 236, which has an collector-emitter junction connected between non-inverting input 198 of amplifier 196 and ground. Output line 188', 192' is connected through a resistor 238 to a line 240 which extends to the inverting input of amplifier 196 and the non-inverting input of amplifier 224. Output line 188', 192' additionally connects through a path including diodes 242a, 242b and 242c and a resistor 244 to the base of a transistor 246. Additionally, diodes 242a–242c are connected through a resistor 248 to the base of transistor 246.

In operation, amplifier 196 produces an output 200 that is two P-N junction drops greater than the desired reflectance level signal received on junction 180, 184. In turn, the voltage on lines 188', 192' follows the level of output signal 200. Amplifier 224 compares the signal on line 240, which is the same as that on output line 188', 192' and the signal on output 218 of unity gain amplifier 214. Because the signal on output 218 follows the desired reflectance level signal on line 180, 184, the output 226 of amplifier 224 will be low as long as the desired reflectance level is at or above the drive signal supplied to the mirror 14, 16. In this situation, transistor 230 is not conducting so resistor 232 is effectively out of the circuit.

Whenever the desired reflectance level on line 180, 184 is below the drive signal, the output of amplifier 224 switches high, which causes transistor 230 to be conducting which places resistor 232 across lines 188', 192' and 190', 194'. This rapidly bleaches mirror 14, 16 by discharging the mirror to the level at which the output of amplifier 224 again switches low and opens transistor 230. Output 226 additionally causes transistor 236 to be conducting whenever transistor 230 conducts in order to clamp output 200 of amplifier 196 low. The purpose of this is to remove any drive voltage from line 188', 192' whenever resistor 236 is attempting to discharge mirror 14, 16 in order to avoid a "tug-of-war" between the current supplied by transistor 202 and the current being discharged through resistor 232. Adder network 220, 222 provides a slight positive offset to output 218 in order to maintain the inverting input to amplifier 224 at a slightly positive level with respect to the input 240 during low signal levels on line 188', 192' as is typical during a bleached condition of the respective mirror 14, 16 such as during daytime conditions. This avoids a unstable condition and "hunting" by amplifier 224.

External mirror drive circuit 182', 186' additionally provides protection against faults typically occurring during the replacement of exterior mirror 14, 16, as well as internal failures within circuit 18'. For example, the shorting of lines 188', 192' and 190', 194' together or to ground will cause an excessive current in positive supply terminal 37 which will be detected by current sensor 36 (FIG. 3), causing voltage regulator 32 to be inhibited. Likewise, a failure in an internal component of circuit 18' which causes the voltage on positive supply terminal 37 to increase to a harmful level, will be clamped by diode path 212a-212c, with the resulting increase in current detected by current sensor 36. If a foreign voltage, such as ignition voltage (16 VDC) or battery voltage (12 VDC) is applied to line 188', 192', the increase in voltage will cause a current through diode path 242a-242c. This will cause transistor 246 to conduct which will clamp the base of transistor 230 to ground, thus inhibiting transistor 230 from being driven to conductance. Therefore, resistor 232 will not be applied to the circuit when there is a foreign voltage across the output lines. This eliminates the necessity of supplying resistor 232 in a high wattage (16 to 30 watts) and allows resistor 232 to have a much lower resistance value, such as one ohm or less. Accordingly, circuit 182', 186' is capable of a more rapid bleaching of mirror 14, 16. Additionally, a foreign voltage on line 188', 192' will be conducted through diodes 242a-242c and resistor 248 to the base of transistor 236 in order to inhibit amplifier 196 from driving transistor 202.

Figure 6A:
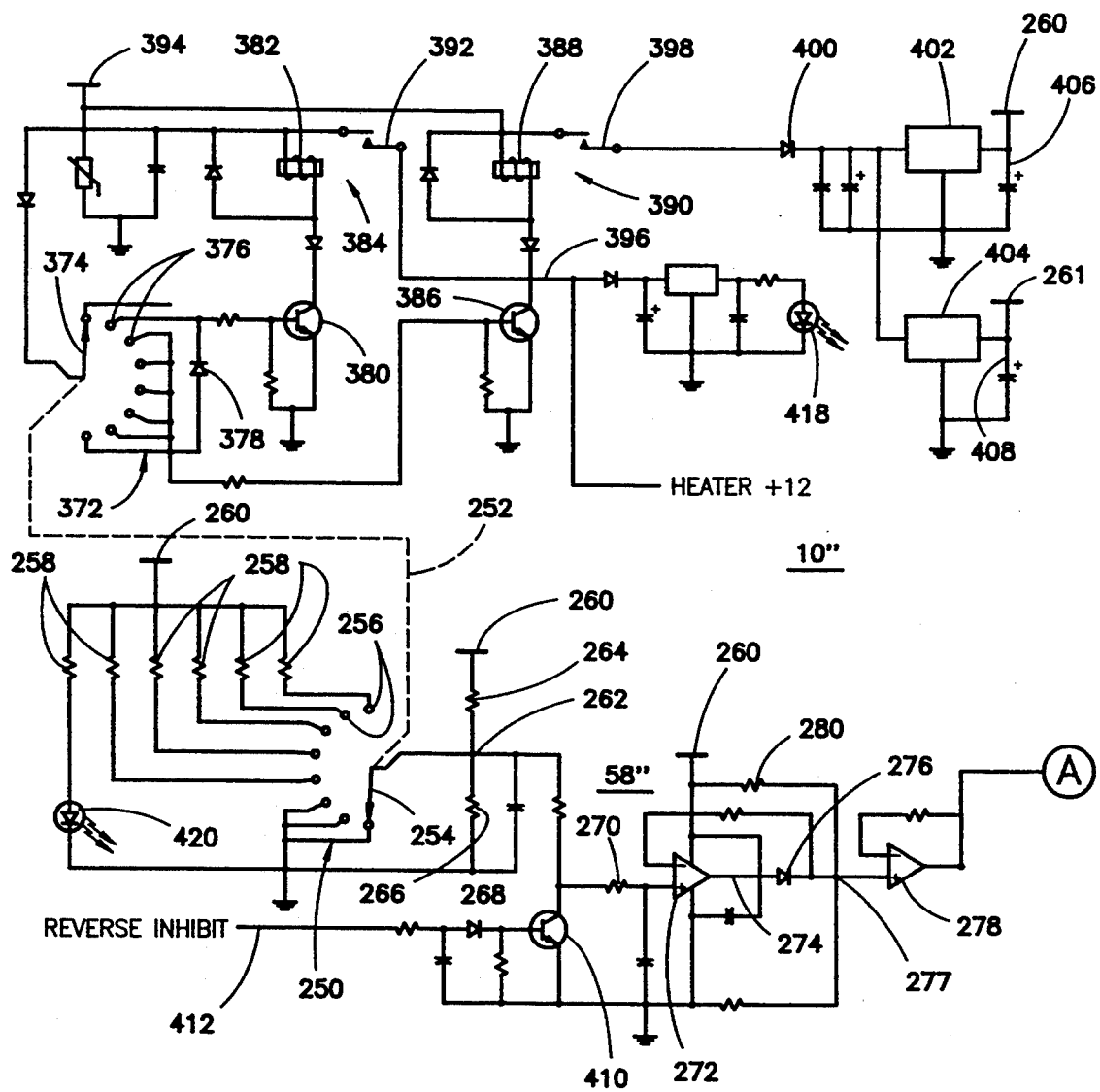
FIG. 6 is an electrical schematic diagram of another alternative embodiment of a fault tolerant drive circuit for an electrochromic mirror system according to the invention.
Figure 6B:
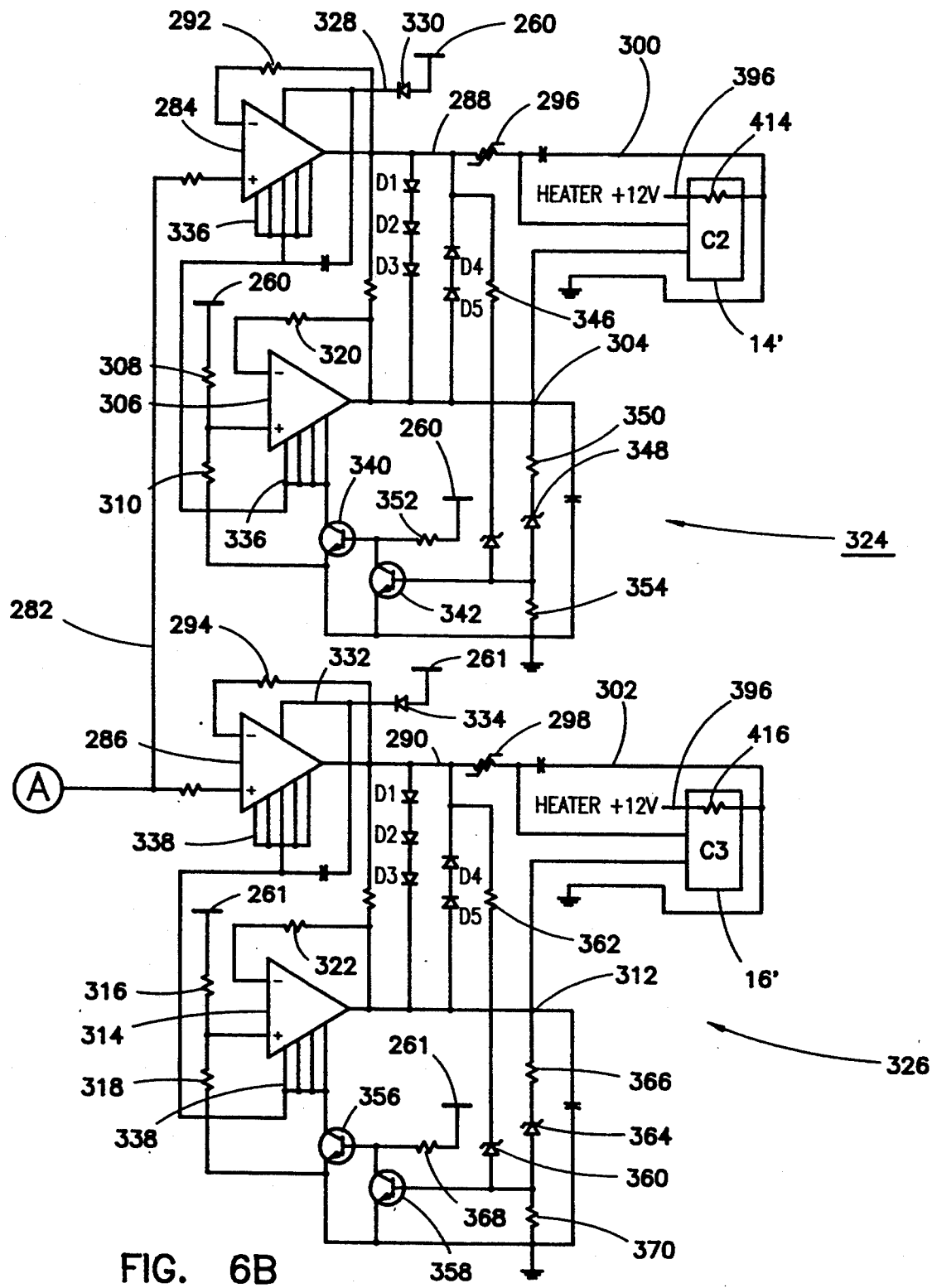

A mirror system 10" that embodies the advantages of the present invention and is particularly useful for large trucks is illustrated in FIG. 6. Large trucks do not have an interior mirror 12. Accordingly, the side mirrors 14', 16' are of essential importance to the truck driver. This is all the more so because the professional truck driver utilizes the mirrors as more than an awareness device and actually uses the mirrors to operate the truck. For example, when backing a trailer to a dock in reverse gear, the driver uses exclusively the side mirrors for operating the vehicle. Because of the large surface area of truck side mirrors, as compared with automobile mirrors, the more durable all solid-state mirror is extremely desirable for this particular application.

It has been determined that truck drivers prefer to have greater control over operation of their vehicle, including the reflective condition of the rearview mirrors. Accordingly, in mirror system 10" the desired reflectance level establishing circuit 58" is manually controllable in order to establish the reflectance level of mirrors 14' and 16' at a fixed comfort level. This comfort level may be set by the driver to a level less than maximum reflectivity, even during daylight conditions. For example, on bright sunlit days, it may be desirable to dim the mirrors in order to eliminate glare from sunlight. Furthermore, during night-time driving, the driver will typically set the reflectance level of the mirror to a level which will retain clear visibility of the environment surrounding the vehicle but reduce the glare from trailing vehicle headlights, to a safe level.

Mirror system 10" includes a first element 250 of a dual-element switch, generally indicated at 252. Element 250 has a wiper 254 and a plurality of fixed contacts 256. The first three of the fixed contacts 256, starting from the wiper position illustrated in FIG. 6, are connected to signal ground. The remaining six contacts are each connected through one resistor 258, each of which has a different resistance value, to a positive voltage terminal 260. Wiper 254 is, in turn, connected to a junction 262 between resistors 264 and 266 connected in series between voltage terminal 260 and signal ground. Junction 262 is, in turn, connected through non-inverting input of a differential amplifier 272. Amplifier 272 includes an output 274 connected through a diode 276 to a junction 277. Junction 277 is connected, through feedback resistor 280, to the inverting input of amplifier 272. Junction 277 is additionally connected to the non-inverting input of an amplifier 278. Output 282 of amplifier 278 is, in turn, connected to the non-inverting inputs of differential amplifiers 284, 286.

Amplifier 284, which is part of a drive circuit 324 for supplying a drive signal to establish the reflectance level of mirror 14', has an output 288 connected with its inverting input through a feedback resistor 292. Amplifier 286, which is part of a drive circuit 326 for supplying a drive signal to establish the reflectance level of mirror 16', has an output 290 connected with its inverting input through a feedback resistor 294. Outputs 288, 290 are connected, respectively, through PTC resistors 296, 298 to output conductors 300, 302 then, respectively, to exterior mirrors 14', 16'. Drive circuit 324 includes an opposite output conductor 304, extending to mirror 14' that is connected with the output of an amplifier 306 whose non-inverting input is connected with a voltage divider defined by resistors 308, 310 connected in series between terminal 260 and ground. Likewise, drive circuit 326 includes a second output conductor 312 extending to mirror 16' that is connected with the output of an amplifier 314 whose non-inverting input is connected with a voltage divider defined by resistors 316, 318 connected in series between terminal 261 and ground. Amplifiers 306, 314 further include feedback resistors 320, 322, respectively.

Amplifiers 284, 306 have a common positive voltage supply terminal 328 (only the connection to amplifier 284 is illustrated), connected through a diode 330 to positive supply terminal 260. Amplifiers 286, 314 have a common positive voltage terminal 332 (only the connection to amplifier 286 is illustrated), connected through a diode 334 to positive supply terminal 261. Amplifiers 284, 306 have a common negative voltage terminal 336 and amplifiers 286, 314 have a common negative voltage terminal 338. Negative voltage terminal 336 is connected to signal ground with the collector-emitter junction of a transistor 340. The base of transistor 340 is connected to signal ground with the collector-emitter junction of a transistor 342. The base of transistor 342 is connected, through a zener diode 348 and resistor 350, to output conductor 304. The base of transistor 340 is connected, through a biasing resistor 352, to positive terminal 260. The base of transistor 342 is connected, through a resistor 354, to signal ground. Negative voltage terminal 338 is connected to signal ground with collector-emitter junction of a transistor 356. The base of transistor 356 is connected to signal ground with the emitter-collector junction of a transistor 358. The base of transistor 358 is connected, through a zener diode 360 and resistor 362, to output 290 and, through a zener diode 364 and resistor 366, to output conductor 312. Bias resistors 368, 370 connect the bases of transistors 356, 358, respectively, to positive supply terminal 261 and signal ground.

Switch 252 additionally includes a second switch element 372 having a wiper 374 and a plurality of fixed contacts 376. The first fixed contact 376 starting from the position of wiper 374 illustrated in FIG. 6, is electrically isolated. The remaining contacts are connected either directly, or through a diode 378, to the base of a transistor 380. The collector-emitter junction of transistor 380 connects the coil 382 of a relay 384 with signal ground. Except for the first two, fixed contacts 376 are all connected together and extend to the base of a transistor 386. The emitter-collector junction of transistor 386 connects the coil 388 of a relay 390 with signal ground. Relay 384 includes a set of normally open contacts 392 which connect a source of ignition voltage 394 with a heater voltage source conductor 396. Relay 390 has a set of normally open contacts 398 which connect ignition voltage source 394, through a diode 400, to the input terminal of parallel voltage regulators 402, 404. Voltage regulator 402 has an output 406 which provides a regulated voltage to positive voltage terminals 260. Voltage regulator 404 has an output 408 which supplies regulated voltage to positive voltage terminals 261.

A transistor 410 has its base connected with a reverse-inhibit input terminal 412 and its collector-emitter joint connected between the junction of resistors 268, 270 and signal ground. The reverse-inhibit input terminal 412 receives a signal to cause transistor 412 to conduct whenever the vehicle is in reverse gear. This forces amplifier 272 to drive mirrors 14', 16' to a maximum reflectivity mode. Heater conductor 396 is connected to one terminal of a heater 414 associated with mirror 14' and one terminal of a heater 416 associated with mirror 16'. The opposite terminal of heaters 414, 416 is connected to signal ground. Indicators 418 and 420 signal to the driver, respectively, that the mirror heaters are energized and that the mirrors are in a potentially colored condition.

In operation, the first position of switch 252, which is that illustrated in FIG. 6, is an "off" position. When the user advances switch 252 to the second position, a voltage is applied to transistor 380 which energizes relay 384 and applies ignition voltage to heaters 414, 416 in order to demist or device the mirrors 14', 16'. In this second position, wiper 254 is connected with ground and relay 390 is not energized. Power is not applied to amplifiers 284, 286, 306, 314. This causes output lines 300, 304 and 302, 312, respectively, to not produce a coloration signal because they are not energized. This bleaches mirrors 14', 16' to a maximum reflectivity condition. As switch 252 is advanced to the third and subsequent positions, wiper 374 applies a voltage to transistor 380, through diode 378, and to transistor 386, energizing both relays 384 and 390. The energizing of relay 390 applies ignition voltage to voltage regulators 402, 404 and, hence, to drive circuits 324, 326. In addition, with relay 384 energized, heaters 414 and 416 are energized in order to heat the surfaces of mirrors 14', 16' to a uniform temperature so that the mirrors will uniformly color to a given reflectivity level. In the third position, wiper 254 also is in contact with signal ground so that mirrors 14', 16' remain fully bleached to a maximum reflectivity level. In the fourth and subsequent position of switch 252, wiper 254 is connected with one of resistors 258. This results in a signal being applied to amplifier 272 that produces a more positive signal on line 282. This raises the voltage on outputs 288 and 290, making them more positive with respect to conductors 304, 312 which are held at a fixed voltage level. This positive voltage produces coloration of mirrors 14', 16'. In each such position, relays 384 and 398 remain energized in order to apply power to heaters 414, 416 and to drive circuits 324, 326.

Amplifiers 284, 306, 286 and 314 have internal thermal regulation which provides protection that limits the current produced by the amplifiers. Accordingly, if output conductors 300, 302, 304, 312 are inadvertently connected to ground, or to each other, the resulting short circuit on the output of one or more amplifiers 284, 306, 286 or 314 will not result in damage to the respective amplifiers because of this internal thermal regulation. If, however, a foreign voltage, such as ignition voltage or heater voltage, is applied to one or more of the output conductors 300, 302, 304 or 312, the internal protection of amplifiers 284, 286, 306 or 314 is insufficient to correct the fault. The reason is that the amplifiers will attempt to sink sufficient current in order to bring down the voltage level on its respective output. Such condition would soon result in destruction of the amplifier.

In order to overcome this difficulty, transistors 342 and 358, through their respective zener diodes 344 and 360 and associated resistors 346, 362, monitor the voltage level on output lines 288 and 290 and, through their respective zener diodes 348 and 364 and associated resistors 350, 366 monitor the voltage level on output conductors 304, 312. In this manner, when a foreign voltage is introduced to one of the output conductors, the increase in voltage will cause a current in the base of the associated transistors 342, 358 high because the breakdown voltage of the associated zener diode will be exceeded. This will result in a conduction of the respective transistor which will cause the base of the associated transistor 340, 356 to be pulled low. This will cause the associated transistor 340, 356 to cease conducting and disconnect the respective negative voltage terminal 336, 338 from signal ground which will deenergize the pair of amplifiers 284, 306, or 286, 314 associated with the fault.

Accordingly, means are provided that are responsive to an excessive voltage on one of the output conductors for interrupting the source of power to the drive circuit means connected with the associated output conductor. In this manner, superior fault protection is provided. The foreign voltage on one or more conductors 300, 302, 312 will typically also feed backward through the associated amplifier 284, 286, 306, 314 and tend to cause an increase in voltage at the positive supply voltage terminal 328, 332. Diodes 330 and 334 will respond to the resulting increase in positive supply voltage in the associated amplifiers 284, 286, 306, 314 by becoming reverse-biased. This prevents any foreign voltage from feeding back to positive supply terminals 260, 261 and, hence, potentially damaging voltage regulators 402, 404. In the embodiment of mirror system 10'', illustrated in FIG. 6, three series connected diodes D1, D2 and D3 are connected from output 288 to conductors 304 and from output 290 to conductor 312. The reason for the additional diode, with respect to those used in mirror systems 10 and 10', is that the voltage required for a fully-colored state of mirrors 14', 16' is 1.8 volts because they are solid-state electrochromic elements. Accordingly, an additional diode-junction-drop is required.

Other effects are realized by the use of an all solid-state electrochromic mirror system. Because the mirror is operated at a higher voltage, the supply voltage to amplifiers 284, 286, 304 and 314 is higher. Accordingly, first power conditioning means is provided in the form of voltage regulator 402, 404. Second power conditioning means includes diodes 330, 334 connected in series between voltage regulators 402, 404 and their respective amplifiers. Because of the higher supply voltage requirements of mirrors 14', 16', the power conditioning means does not have as large of a voltage range to regulate. Accordingly, the forward-diode junction drop provided by diodes 330, 334 brings the amount of regulation required by voltage regulators 402, 404 into a reasonable range. In addition to the particular voltage level requirements of the all solid-state electrochromic devices, such devices do not require a continuous supply of current to retain coloration.

Furthermore, mirror system 10'' does not drive an indicator from a regulated voltage source, such as indicator diode 86 in FIG. 2. The result is a further lessening in the drive current required. Accordingly, voltage regulators 402, 404 may be provided by more conventional voltage regulators. In the illustrated embodiment, voltage regulators 402, 404 are commercially available and are marketed by Motorolla under Model No. MC7808BT. Amplifiers 284 and 306 as well as 286 and 314, are commonly packaged in pairs in a device that is commercially available and marketed by SGS-Thomson under Model No. L272. Mirrors 14', 16' incorporating heaters 414 and 416 are preferably of the type disclosed in copending patent application Ser. No. 643,186 filed Jan. 18, 1991 by Niall R. Lynam for ELECTROCHROMIC MIRROR FOR VEHICLES, the disclosure of which is hereby incorporated herein by reference.

Mirror system 10'' advantageously provides a first voltage conditioning means 402 for supplying the supply voltage for drive circuit 324 and a second voltage conditioning means 404 for supplying supply voltage to drive circuit 326. With this arrangement, if damage to one of the mirrors 14', 16' and its associated drive circuit 324, 326 respectively, is sufficient to disrupt the supply voltage to the respective drive circuit, the other mirror is capable of ongoing operation notwithstanding the failure. Thus, one mirror will remain fully operational until the damage may be fixed. Although desired reflectance level circuit 58'' is illustrated being supplied by regulated voltage from voltage regulator 402, and hence would fail along with catastrophic damage to drive circuit 324, it would be possible to provide another independent voltage regulator to supply the desired reflectance level circuit in order to provide even greater reliability.

Thus, it is seen that the principles of the invention may be applied to manually controlled remote mirror systems as well as to automatic rearview mirror systems. In all cases, the elements of the drive circuit that produces the drive signals to color the electrochromic mirrors, are fully protected against damage from the foreseeable mishaps that may occur with respect to the electrical conductors extending to the exterior mirrors. Furthermore, the mirrors themselves are protected against destruction from such mishaps. In addition, the incapacitating of one exterior mirror does not necessarily prevent the glare protection means of the other exterior mirror from operating.

Changes and modifications in the specifically described embodiments can be carried out without departing from the principles of the invention, which is intended to be limited only by the scope of the appended claims, as interpreted according to the principles of patent law, including the Doctrine of Equivalents.

The embodiments of the invention in which an exclusive property or privilege is claimed are defined as follows:

1. In an electrochromic rearview mirror system for a vehicle having a passenger compartment, said system including at least one exterior electrochromic mirror assembly positioned outside the vehicle passenger compartment, said electrochromic mirror assembly including an electrochromic mirror element and a deicing heater element for removing ice and dew from said electrochromic mirror element during inclement weather, said electrochromic mirror element being responsive to a drive signal that is less than a maximum voltage potential of 1.8 volts to establish the reflectance level of the electrochromic mirror element, said deicing heater element operating at a voltage level of at least approximately 12 volts, a heater supply circuit for supplying one of a vehicle battery voltage and a vehicle ignition voltage to said heater element, and a control system for providing said drive signal to said electrochromic mirror element including at least one electrical conductor to conduct said drive signal to said electrochromic mirror element, comprising:

desired reflectance level determining means for producing a signal indicative of a desired reflectance level;

output drive means responsive to said desired reflectance level signal for producing said drive signal that is applied to said mirror;

electrical supply means for supplying electrical energy to said output drive means; and circuit protection means for sensing a foreign voltage on one of said electrical conductors, said foreign voltage being at least approximately 12 volts, and taking corrective action in response to said foreign voltage that prevents said foreign voltage from being applied to said electrochromic mirror element, in order to protect said electrochromic mirror element during repair or replacement of said exterior electrochromic mirror assembly.

2. The electrochromic rearview mirror system in claim 1 wherein said circuit protection means includes disconnect means responsive to a fault condition on said at least one electrical conductor for removing electrical energy from said output drive means.

3. The electrochromic rearview mirror system in claim 2 wherein said disconnect means is also responsive to a fault condition in said electrical supply means for removing electrical energy from said output drive means.

4. The electrochromic mirror system in claim 2 wherein said electrical supply means includes first and second supply lines and said circuit protection means includes means for determining that the current through either of said supply lines exceeds a predetermined level and for disconnecting that particular supply line from said output drive means.

5. The electrochromic rearview system in claim 4 wherein said circuit protection means includes means for disconnecting both said supply lines from said output drive means in response to the current through either of said supply lines exceeding a predetermined level.

6. The electrochromic rearview system in claim 4 wherein said output drive means includes first and second amplifiers, each having an output connected with one of said electrical conductors such that the drive signal produced by said output drive means is produced across said outputs.

7. The electrochromic rearview system in claim 2 wherein said circuit protection means includes means for monitoring the voltage level on said at least one electrical conductor for activating said disconnect means in response to an excessive voltage.

8. The electrochromic rearview mirror system in claim 2 wherein said circuit protection means further includes a fusible link in series with said at least electrical conductor, said link adapted to open in response to a foreign voltage being applied to said other one of said electrical conductors.

9. The electrochromic rearview system in claim 1 wherein said circuit protection means includes disconnect means responsive to a fault condition in said control system for removing electrical energy from said output drive means.

10. The electrochromic rearview system in claim 9 wherein said electrical supply means includes first and second supply lines and wherein said disconnect means includes means responsive to the current through one of said supply lines exceeding a predetermined level and for disconnecting that particular supply line from said output drive means.

11. The electrochromic mirror system in claim 10 including means for limiting the voltage applied by said output drive means, whereby a fault condition in said control system tending to supply an excessive drive signal to said at least one of said mirrors will cause the current through said one of said supply lines to exceed said predetermined level.

12. The electrochromic rearview system in claim 1 wherein said circuit protection means includes unidirectional conducting means in series with said at least electrical conductor, whereby a foreign voltage applied to said one of said electrical conductors will not cause a current in said control system.

13. The electrochromic mirror system in claim 12 wherein said at least one electrical conductor includes a pair of electrical conductors and said circuit protection means includes grounding of one of said electrical conductors, whereby a foreign voltage applied to said one of said electrical conductors will not cause a current in said drive circuit.

14. The electrochromic rearview mirror system in claim 1 wherein said circuit protection means includes a voltage limiter which prevents a voltage across said electrochromic mirror element that is greater than said maximum voltage potential.

15. The electrochromic rearview mirror system in claim 14 wherein said circuit protection means includes a circuit breaker in series with said voltage limiter.

16. The electrochromic rearview mirror system in claim 1 wherein said electrochromic mirror element is a solid-state electrochromic reflectance device.

17. The electrochromic rearview mirror system in claim 1 wherein said electrochromic mirror element is an electrochemichromic reflectance device.

18. The electrochromic rearview mirror system in claim 1 wherein said at least one exterior electrochromic mirror assembly includes two exterior electrochromic mirror assemblies positioned on opposite sides of said passenger compartment, each of said mirror assemblies including a said electrochromic mirror element, and a said deicer heater element, and wherein said control system provides a drive signal to the electrochromic mirror elements of both said exterior electrochromic mirror assemblies.

19. The electrochromic rearview mirror system in claim 18 wherein said mirror elements of both said exterior electrochromic mirror assemblies are connected in electrical parallel connection, whereby said control system provides the same drive signal to the mirror elements of both said exterior electrochromic mirror assemblies.

20. The electrochromic rearview mirror system in claim 1 further including an interior rearview mirror assembly positioned within said passenger compartment, said interior rearview mirror assembly including a second said electrochromic mirror element and wherein said control system provides a drive signal to the electrochromic mirror element of said interior rearview mirror assembly.

21. The electrochromic rearview mirror system in claim 20 wherein said interior rearview mirror assembly includes a case housing said second electrochromic mirror element and wherein said control system is in said case.

22. The electrochromic rearview mirror system in claim 20 wherein said mirror elements of both said exterior electrochromic mirror assembly and said interior rearview mirror assembly are connected in electrical parallel connection, whereby said control system provides the same drive signal to the mirror elements of both said exterior electrochromic mirror assembly and said interior rearview mirror assembly.

23. The electrochromic rearview mirror system in claim 1 wherein said foreign voltage may be one of a vehicle battery voltage and a vehicle ignition voltage.

24. In a rearview mirror system for a vehicle having a passenger compartment, said system including a plurality of electrochromic exterior mirrors positioned outside the vehicle passenger compartment, each of said mirrors being responsive to a drive signal to establish the reflectance level of that particular mirror, a control system including electrical conductors for providing one said drive signal to each said mirror, said control system comprising:
desired reflectance level determining means for producing a signal indicative of a desired reflectance level;
drive means responsive to said desired reflectance level signal for producing said drive signal that is applied to each of said mirrors;
first and second electrical supply lines for supplying electrical energy to said drive means;
fault sensor means for sensing a fault condition on one of said conductors;
disconnect means responsive to said fault sensor means for removing electrical energy from said drive means when said fault sensor means senses a fault condition;
wherein said fault sensor means includes a current sensor in each of said supply lines for sensing the current on the respective supply line and wherein said disconnect means is responsive to both current sensors in order to remove electrical energy from the drive means when one of the current sensors senses a current that exceeds a predetermined level; and
wherein one of said current sensor includes a transistor having an collector-emitter junction between the respective one of said supply lines and said drive means and wherein said disconnect means is responsive to the voltage across said collector-emitter junction exceeding a predetermined level in order to remove electrical energy from said drive means.

25. The rearview mirror system in claim 24 wherein said disconnect means includes means for causing said transistor to be nonconducting in order to disconnect said drive means from said respective one of said supply lines.

26. The rearview system in claim 24 wherein said disconnect means includes a latch that is set in response to said voltage across said collector-emitter junction exceeding said predetermined level and means responsive to said latch being set for removing electrical energy from said drive means.

27. In an electrochromic rearview mirror system for a vehicle having a passenger compartment, said system including a plurality of electrochromic exterior mirrors positioned outside the vehicle passenger compartment, each of said mirrors being responsive to a drive signal to establish the reflectance level of that particular mirror, a control system including electrical conductors for providing one said drive signal to each of said mirrors, said control system comprising:

desired reflectance level determining means for producing a signal indicative of a desired reflectance level;

drive means responsive to said desired reflectance level signal for producing one said drive signal that is applied to one of said mirrors;

first and second electrical supply lines for supplying electrical energy to said drive means; fault sensor means for sensing a fault condition on one of said conductors; disconnect means responsive to said fault sensor means for removing electrical energy from said drive means when said fault sensor means senses a fault condition; said fault sensor means includes a current sensor in each of said supply lines for sensing the current on the respective supply line; and wherein each of said current sensors includes a resistor between the respective one of said supply lines and said drive means and wherein said disconnect means is responsive to the voltage across said resistor exceeding a predetermined level in order to remove electrical energy from said drive means.

28. The electrochromic rearview mirror system in claim 27 wherein said disconnect means includes a latch that is set in response to said voltage across said resistor exceeding said predetermined level and means responsive to said latch being set for removing electrical energy from said drive means.

29. The electrochromic rearview mirror system in claim 22 further including means for limiting the level of said drive signal below a predetermined level.

30. In a electrochromic rearview mirror system for a vehicle including at least one mirror, said mirror being responsive to a drive signal to establish the reflectance level of said mirror, a control system for providing said drive signal to said mirror, said control system comprising:

desired reflectance level determining means for producing a signal indicative of a desired reflectance level;

an output drive means responsive to said desired reflectance level signal for producing said drive signal that is applied to said at least one mirror;

electrical energy supply means for supplying electrical energy to said output drive means, said supply means including an input terminal connected with a source of electrical energy and voltage regulating means responsive to said input terminal for regulating the voltage level of the electrical energy supplied to said drive means;

said voltage regulating means including first and second power conditioning means electrically serially connected between said input terminal and said drive means, wherein each of said power conditioning means includes a supply voltage input and a regulated voltage output and wherein the supply voltage input of said first conditioning means is connected with said input terminal, the supply voltage input of said second power conditioning means is connected with the regulated voltage output of said first power conditioning means and the regulated voltage output of said second power conditioning means is applied to said drive means; and wherein said voltage regulating means includes voltage reference generating means for generating a first reference voltage and a lower second reference voltage and wherein said first power conditioning means is responsive to said first reference voltage to produce a regulated voltage on its regulated voltage output and said second power conditioning means is responsive to said second reference voltage to produce a regulated voltage on its regulated voltage output.

31. The electrochromic rearview mirror system in claim 30 further including fault sensing means for sensing a fault condition in said mirror system and means responsive to a fault condition for forcing said second reference voltage to a predetermined level that causes said second power conditioning means to produce zero volts on its regulated voltage output.

32. The electrochromic rearview mirror system in claim 31 wherein said means responsive to a fault condition includes a latch that latches said reference voltage to said predetermined level in response to a said fault condition and unlatches said reference voltage in response to removal of said source of electrical energy from said system.

33. The electrochromic rearview mirror system in claim 31 wherein said electrical energy supply means includes another input terminal adapted to be connected with said supply of electrical energy and switch means for selectively connecting said another input terminal to said drive means, said switch means being responsive to a fault condition in order to disconnect said drive means from said another input terminal.

34. An electrochromic rearview mirror system for a vehicle having a passenger compartment, including an interior electrochromic rearview mirror positioned inside the passenger compartment and an exterior electrochromic rearview mirror positioned outside the vehicle compartment, each said mirror being responsive to a drive signal to establish the reflectance level of that mirror, and a control system for providing drive signals to said interior and exterior rearview mirrors, comprising:

a desired reflectance level circuit producing at least one signal indicative of a desired reflectance level;

an interior mirror drive circuit responsive to one said signal indicative of a desired reflectance level for producing one said drive signal;

interior electrical supply conductors for supplying said one drive signal to said interior mirror in order to establish the reflectance level of the interior mirror;

an exterior mirror drive circuit responsive to said at least one signal indicative of a desired reflectance level for producing another said drive signal;

exterior electrical supply conductors for supplying said another drive signal to said exterior mirror in order to establish the reflectance level of the exterior mirror; and wherein said interior and exterior supply conductors are isolated from each other and wherein said interior and exterior mirror drive circuits are isolated from each other, so that a fault at said exterior mirror will be isolated from said interior mirror and interior mirror drive circuit.

35. An exterior electrochromic rearview mirror system for a vehicle having a passenger compartment comprising:

at least one exterior electrochromic mirror assembly positioned outside said passenger compartment, said at least one mirror assembly including an electrochromic mirror element which colors to a partial reflectance level in response to a coloration voltage signal that is less than a maximum voltage potential of 1.8 volts, a first electrical conductor for supplying said coloration voltage signal to said electrochromic mirror element, a deicing heater element for removing ice and dew from said electrochromic mirror element during inclement weather which operates at a voltage level of at least approximately 12 volts, and a second electrical conductor for supplying one of a vehicle battery voltage and a vehicle ignition voltage to said heater element; and a fault protection circuit which detects a foreign voltage on said first conductor, said foreign voltage being at least approximately 12 volts, and responds to said foreign voltage by preventing said foreign voltage from being applied to said electrochromic mirror element in order to protect said electrochromic mirror element during repair or replacement of said exterior electrochromic mirror assembly.

36. The exterior electrochromic rearview mirror system in claim 35 wherein said fault protection circuit includes a voltage limiter which prevents a voltage across said electrochromic mirror element that is greater than said maximum voltage potential.

37. The exterior electrochromic rearview mirror system in claim 36 wherein said fault protection circuit includes a circuit breaker in series with said voltage limiter.

38. The exterior electrochromic rearview mirror system in claim 38 wherein said circuit breaker is a quick-acting disconnect device.

39. The exterior electrochromic rearview mirror system in claim 37 wherein said disconnect device is one of a fuse and a PTC thermistor.

40. The exterior electrochromic rearview mirror system in claim 39 wherein said disconnect device is a fuse.

41. The exterior electrochromic rearview mirror system in claim 36 wherein said voltage limiter includes a parallel connection of reverse-polarity diodes.

42. The exterior electrochromic rearview mirror system in claim 35 wherein said electrochromic mirror element is a solid-state electrochromic reflectance device.

43. The exterior electrochromic rearview mirror system in claim 35 wherein said electrochromic mirror element is an electrochemichromic reflectance device.

44. The exterior electrochromic rearview mirror system in claim 35 wherein said at least one exterior electrochromic mirror assembly includes two exterior electrochromic mirror assemblies positioned on opposite sides of said passenger compartment, each of said mirror assemblies including a said mirror element, a said electrical conductor and a said heater element.

45. The exterior electrochromic rearview mirror system in claim 44 including a drive circuit for supplying said coloration voltage to the electrochromic mirror elements of said two electrochromic mirror assemblies.

46. The exterior electrochromic rearview mirror system in claim 45 wherein said electrochromic mirror elements of said two electrochromic mirror assemblies are connected in electrical parallel connection, whereby said drive circuit supplies the same coloration voltage to both said electrochromic mirror assemblies.

47. The exterior electrochromic rearview mirror system in claim 35 further including an interior rearview mirror assembly positioned within said passenger compartment, said interior rearview mirror assembly includes a second said electrochromic mirror element, a second at least one electrical conductor for supplying said coloration voltage signal to said second electrochromic mirror element and a drive circuit for supplying said coloration voltage signal to each of said conductors.

48. The exterior electrochromic rearview mirror system in claim 47 wherein said interior rearview mirror assembly includes a case housing said second electrochromic mirror element and wherein said drive circuit is in said case.

49. The exterior electrochromic rearview mirror system in claim 47 wherein said first and second electrochromic mirror elements are connected in electrical parallel connection whereby said drive circuit supplies the same coloration voltage to both said electrochromic mirror elements.

50. The exterior electrochromic rearview mirror system in claim 35 wherein said foreign voltage may be one of a vehicle battery voltage and a vehicle ignition voltage.

* * * * *

UNITED STATES PATENT AND TRADEMARK OFFICE
CERTIFICATE OF CORRECTION

PATENT NO. : 5,424,898
DATED : June 13, 1995
INVENTOR(S) : Mark L. Larson, et al.

Page 1 of 3

It is certified that error appears in the above-indentified patent and that said Letters Patent is hereby corrected as shown below:

Column 3, line 59;
    After "application" delete --Ser. No.--.

*Column 4, line 17;
    "such a" should be --such as--.

Column 9, line 49;
    After "48" delete -- - --.

Column 10, line 39;
    After "protected" insert --.--.

Column 14, line 2;
    After "through" insert --resistors 268, 270 to the--

Column 14, line 48;
    After "diode" insert --344 and a resistor 346, to output 288 and, through a zener diode--.

*Column 15, line 5;
    "emitter-collector" should be --collector-emitter--.

Column 15, line 38;
    "device" should be --de-ice--.

Column 16, line 43;
    After "302," insert --304,--.

*Column 17, line 18;
    "Motorolla" should be --Motorola--.

*Column 17, line 21;
    "SGS-Thomson" should be --SGS Thompson--.

UNITED STATES PATENT AND TRADEMARK OFFICE
CERTIFICATE OF CORRECTION

PATENT NO.  : 5,424,898
DATED       : June 13, 1995
INVENTORS   : Larson et al.

It is certified that error appears in the above-identified patent and that said Letters Patent is hereby corrected as shown below:

Column 18, line 48;
    After "electrochromic" insert --rearview--.

Column 18, line 55;
    After "rearview" insert --mirror--.

Column 18, line 61;
    After "rearview" insert --mirror--.

Column 18, line 67;
    After "rearview" insert --mirror--.

Column 19, line 6;
    After "least" insert --one--.

Column 19, line 10;
    After "rearview" insert --mirror--.

Column 19, line 15;
    After "rearview" insert --mirror--.

Column 19, line 22;
    After "electrochromic" insert --rearview--.

Column 19, line 29;
    After "rearview" insert --mirror--.

*Column 19, line 35;
    After "electrochromic" insert --rearview--.

Column 20, line 61;
    "sensor" should be --sensors--.

UNITED STATES PATENT AND TRADEMARK OFFICE
CERTIFICATE OF CORRECTION

PATENT NO. : 5,424,898
DATED : June 13, 1995
INVENTOR(S) : Mark L. Larson, et al.

Page 3 of 3

It is certified that error appears in the above-indentified patent and that said Letters Patent is hereby corrected as shown below:

Column 21, line 6;
  After "rearview" insert --mirror--.

Column 21, line 50;
  "claim 22" should be --claim 27--.

Column 23, line 52, claim 38;
  "claim 38" should be --claim 37--.

Column 23, line 55, claim 39;
  "claim 37" should be --claim 38--.

Signed and Sealed this

Twenty-eighth Day of November 1995

Attest:

BRUCE LEHMAN

*Attesting Officer*          *Commissioner of Patents and Trademarks*